Feb. 28, 1961 W. D. ANDERSON 2,972,841
METHOD OF UNIVERSAL PRELOAD GRINDING OF DUPLEX BALL BEARINGS
Filed July 31, 1958 2 Sheets-Sheet 2
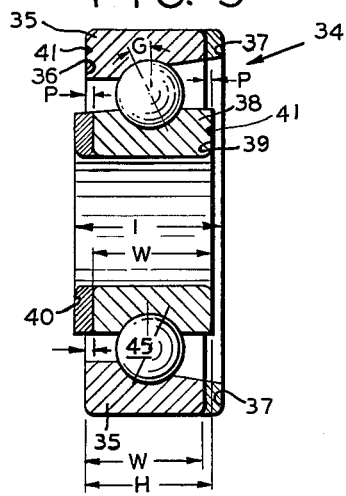
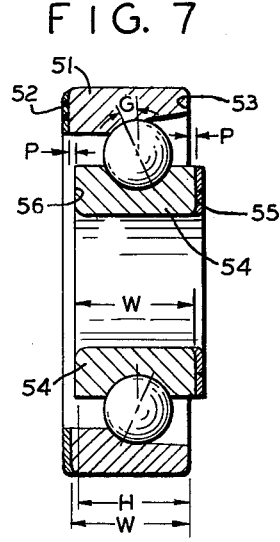
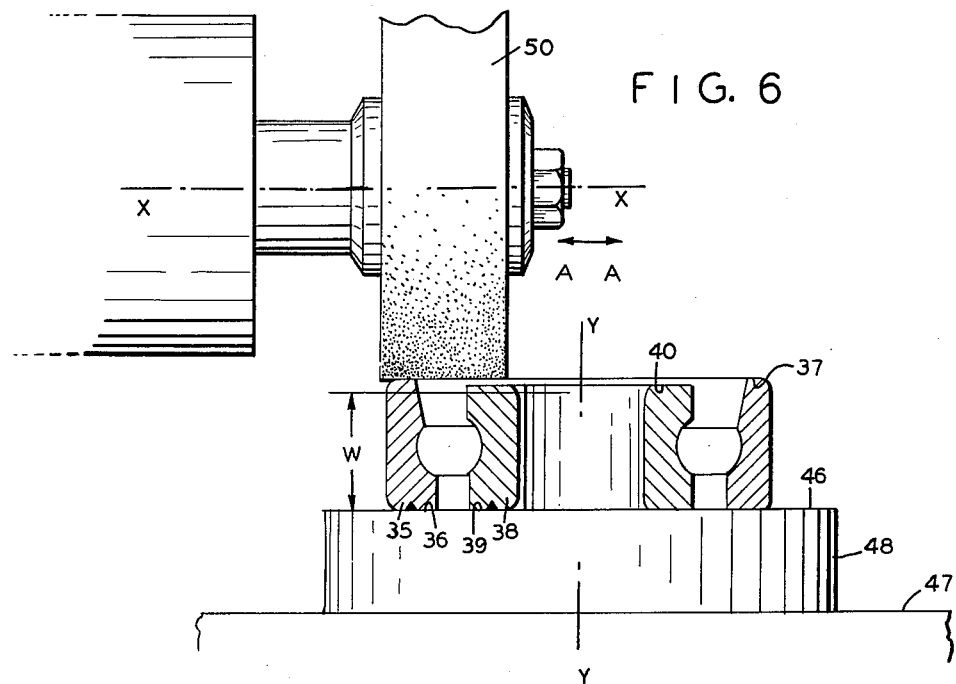
INVENTOR.
WARREN D. ANDERSON
BY
John P. Chandler
HIS ATTORNEY United States Patent Office 2,972,841
Patented Feb. 28, 1961

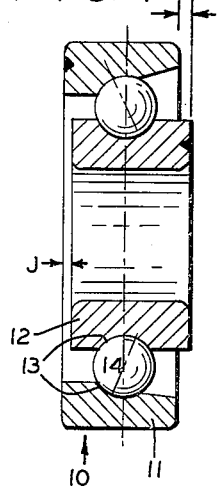
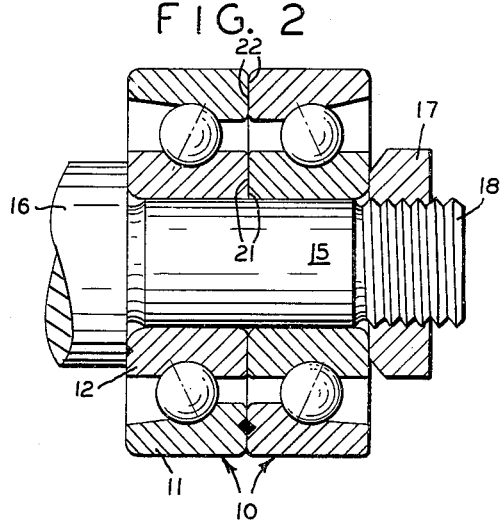
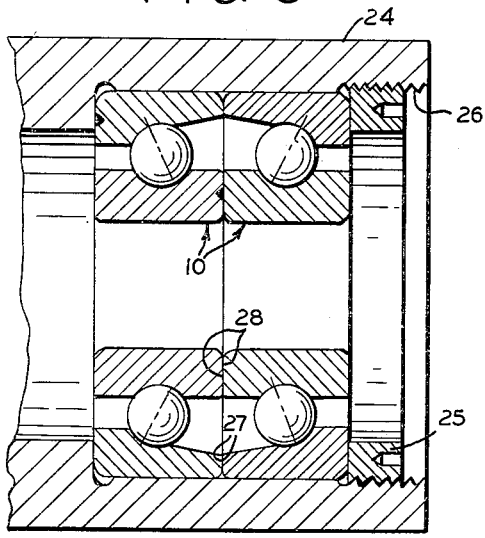
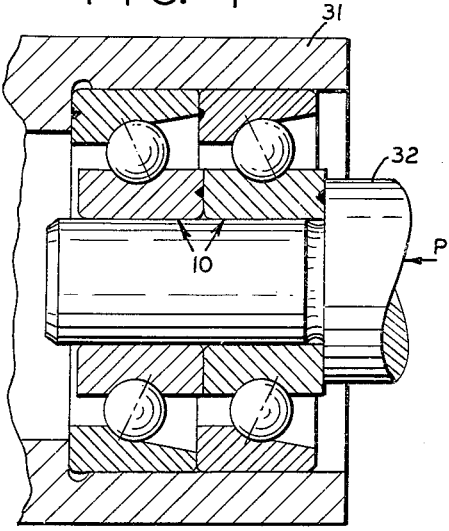

2,972,841

METHOD OF UNIVERSAL PRELOAD GRINDING OF DUPLEX BALL BEARINGS

Warren D. Anderson, Glenbrook, Conn., assignor to Norma-Hoffman Bearings Corporation, Stamford, Conn., a corporation of New York Filed July 31, 1958, Ser. No. 752,328

5 Claims. (Cl. 51—291)

This patent application relates to a new and novel method of grinding the faces of ball bearing rings so as to provide for universal preloading whereby any two bearings so ground may be used as a duplex pair, either face-to-face, back-to-back, or in back-to-face tandem mounting.

The method described herein provides this type of universal preload grinding to a higher degree of accuracy than obtainable by previously used methods, and also permits this to be accomplished at a substantial saving in time and labor.

In the drawings:

Fig. 1 is a section taken through a conventional ball bearing of the angular contact construction.

Fig. 2 shows a sectional view of a pair of bearings mounted in back-to-back duplex relationship.

Fig. 3 shows a sectional view of a pair of ball bearings mounted in face-to-face duplex relationship.

Fig. 4 shows a sectional view of a pair of ball bearings mounted in tandem relationship.

Fig. 5 is a section taken through a ball bearing as it might appear before grinding the faces of the inner and outer rings for universal preloading.

Fig. 6 shows the two rings from the bearing of Fig. 5 mounted in a surface grinder.

Fig. 7 shows a ball bearing prior to preload grinding, the bearing having a different configuration from that shown in Fig. 5.

Referring to Fig. 1, the bearing structure 10 includes an outer ring 11 and an inner ring 12 having complemental raceways 13 for a plurality of balls 14. The rings are shown as being of unequal width; inner ring 12 being slightly wider than outer ring 11 and the faces of the rings when at rest are offset by a distance F on the right side and J on the left side. In a given pair of bearings, however, if protrusions F and J are equal to each other and of a specified magnitude, then the pair of bearings is suitable for universal duplex mounting, that is to say, two such matched bearings of identical dimensions could be mounted together in any one of the three distinct arrangements.

For example, in Fig. 2, two such bearings 10 are shown mounted in back-to-back relationship on a reduced section 15 of shaft 16 with the inner rings clamped together by lock nut 17 on a threaded terminal section 18. Before tightening lock nut 17, the faces 21 of the inner rings will be separated by a distance twice J when thrust faces 22 are in contact. The tightening of lock nut 17 brings faces 21 together and preloads the two bearings by virtue of elastic strains developed in the balls and raceways, and thus provides a very rigid bearing assembly without end play and with minimum elastic yield under load.

Another example is shown in Fig. 3 where two such bearings 10 are mounted in face-to-face relationship in housing 24 and clamped by lock nut 25 in an internally threaded section 26. In this case, before tightening lock nut 25, the faces 27 will be separated by a distance twice F when faces 28 are in contact. Here again tightening of the lock nut preloads the two bearings by virtue of elastic strain. The preloading brings faces 27 together. It will be understood from the foregoing that the desired results could not be achieved unless the inner and outer rings of each pair were of the same width.

The third example is shown in Fig. 4 where two such bearings 10 are mounted in tandem relationship in housing 31. If a thrust load P is applied to shaft 32 this thrust load will be equally divided between the two bearings. This division, however, would not be equal if offsets F and J were unequal.

Referring again to Fig. 1, it is theoretically possible to control the various grinding operations in manufacturing the outer ring 11 and inner ring 12, so that the rings when assembled with suitable balls would result in protrusion F being equal to protrusion J. However, this is difficult and costly. In normal manufacturing operations there will frequently be a slight variation in width between the inner and outer rings of each pair. More significant, however, is the fact that in a given pair, the respective raceways will not be located precisely the same distance from the thrust faces. These factors account for the variations in the extent of protrusion or intrusion of the respective faces of one ring relative to the same faces of the other rings in a pair of bearings. The amount of protrusion F and J shown in Fig. 1 is exaggerated. The amount of protrusion used in actual practice depends on the amount of preload required in the bearings after they are mounted and clamped together. In normal practice, the magnitude of this protrusion will be of the order of 0.0001" to perhaps 0.0100".

While it is a relatively easy matter to keep the width of the inner and outer rings equal to each other within very close limits, it is more difficult to control the location of the individual raceways relative to the face of the bearing as well as the raceway diameter and the conformity of the raceways to the balls, all of which affect the amount of protrusion F and J when the bearing is finally assembled.

The usual method of making protrusion F and protrusion J equal to each other and of a specified magnitude is to maintain nominally close dimensional control of the various face and raceway grinding operations, and then to make a trial assembly of the rings and balls, then measure the amount of protrusion F and protrusion J, then remove the balls from the bearing and grind the faces of the inner and outer rings to provide the specified protrusion.

In general, this means two measuring operations and two grinding operations. The method of this invention, however, requires only a single measuring operation and a single grinding operation. This not only provides savings in time and labor, but also provides more accurate control of the resultant protrusion and preload.

Fig. 5 shows a conventional ball bearing 34 as it might appear before preload grinding. Outer ring 35 has a thrust face 36 and a non-thrust face 37. Inner ring 38 has a ball seating thrust face 39 and a non-thrust face 40. If a thrust load of a few pounds is applied against the thrust faces 39 and 36, then the balls will seat in the raceways, so that a line through the contact points between the balls and races will make contact angle G with a plane through the ball centers. If we define the assembled width of the bearing to be the axial distance from one face of the inner ring to the opposite face of the outer ring, it will be evident that the bearing initially has two assembled widths, H and I. In general, these will be unequal and in all cases we will use the letter H to designate the smallest assembled width which we will refer to as simply the minimum width.

Also, in Fig. 5, if P is the required protrusion on each side of the bearing, it will be necessary to grind non-thrust faces 37 and 40. This grinding will result in outer ring 35 and inner ring 38 having a specified width W where $$W = H - P$$

Using the method of this invention, the method of preloading to obtain protrusion P on both sides of the bearing is as follows:

Referring to Fig. 5, the minimum assembled width H is measured, then the specified ring width W is determined by the above formula, then the bearing is disassembled and faces 36 and 39 defining width H are placed on chuck 46 of a grinding machine as shown in Fig. 6. Chuck 46 is arranged to rotate about axis Y—Y and grinding wheel 50 is arranged to rotate about axis X—X, and simultaneously reciprocate in directions AA. Faces 37 and 40 of the two rings are thus simultaneously ground until they attain the common specified width W. The portions so removed from faces 37 and 40 are indicated by sectioning different from the remaining sectioning. When rings 35 and 38 are reassembled with the balls as shown in Fig. 5, the bearing will have the required protrusion P on each side and will thus be suitable for universal duplex mounting.

In Fig. 7 is shown a ball bearing before universal pre-load grinding, said bearing having a different configuration from the bearings shown in Fig. 5. This bearing has an outer ring 51 with a thrust face 52 and a non-thrust face 53. It also has an inner ring 54 with a thrust face 55 and a non-thrust face 56.

It will be noted that thrust face 55 of inner ring 54 extends beyond non-thrust face 53 of outer ring 51. Also thrust face 52 of outer ring 51 extends beyond non-thrust face 56 of inner ring 54. The minimum assembled width H is measured between non-thrust face 53 and non-thrust face 56. Again, if the required protrusion is P, then it will be required to grind thrust faces 52 and 55 so that inner ring 54 and outer ring 51 have a common specified width W where $$W = H + P$$

In this case the preload grinding is done exactly as described above for Fig. 5, except that non-thrust faces 53 and 56 are placed on chuck 46 of the surface grinder and the grinding operation is performed on thrust faces 52 and 55.

For practical reasons, it is desirable to control preceding manufacturing operations so that the bearing conforms to the configuration of Fig. 5 before the preloading is accomplished. There are two reasons for this preference. In the first place, thrust faces 36 and 39 are usually used for locating the ring during raceway grinding operations so that the parallelism of the raceway to these thrust faces is maintained with extreme precision. It is therefore undesirable to perform any subsequent preload grinding operations on faces 36 and 39, since this may destroy some of the precision. Secondly, thrust faces 36 and 39 usually carry identifying symbols which are stamped into the metal as indicated at position 41. If preload grinding is performed on thrust faces 52 and 55 as shown in Fig. 7, there is grave danger that identification stamping will be mutilated or obliterated. This preference, however, is purely practical and it should be made clear that the method of this invention can be applied to the configuration of Fig. 7 if desired.

What I claim is:

1. In a ball bearing having an inner ring with thrust and non-thrust faces and an outer ring with oppositely disposed thrust and non-thrust faces with one set of oppositely disposed thrust and non-thrust faces defining the minimum width of the bearing while the bearing is under a ball seating load, the method of universal preload grinding to produce an equal specified protrusion between each pair of adjacent faces, which method consists in disassembling the bearing, then placing one of the faces included in said set upon the work support surface of a grinding machine, then reversing the position of the other ring and placing the second face of said set upon said work support surface, then grinding the exposed faces of the rings until both of said faces are co-planar and both of said rings have a width differing from said minimum width by an amount equal to said specified protrusion, and then reversing one ring relative to the other and reassembling the bearings so that the thrust faces of the rings are in their original oppositely disposed relationship.

2. In a ball bearing having an inner ring with thrust and non-thrust faces and an outer ring with oppositely disposed thrust and non-thrust faces wherein said thrust faces define the initial minimum width H while the bearing is under a ball seating thrust load, the method of universal pre-load grinding to produce a specified protrusion P between each pair of adjacent faces, which method consists in disassembling the bearing, then placing the thrust face of one ring upon the work support surface of a grinding machine, then reversing the position of the other ring and placing its thrust face upon said work support surface, then grinding said non-thrust faces until both of said non-thrust faces are co-planar and of a width W defined by: $W = H - P$; and then reversing one ring relative to the other and reassembling the bearings so that the thrust faces of the rings are in their original oppositely disposed relationship.

3. In a ball bearing having an inner ring with thrust and non-thrust faces and an outer ring with oppositely disposed thrust and non-thrust faces with said thrust faces defining the initial minimum width of the bearing while the bearing is under a ball seating thrust load, the method of universal pre-load grinding to produce an equal specified protrusion between each pair of adjacent faces, which method consists in disassembling the bearing, then placing the thrust face of one ring upon the work support surface of a grinding machine, then reversing the position of the other ring and placing its thrust face upon said work support surface, and then grinding said non-thrust faces until both of said non-thrust faces are co-planar and both of said rings have a width which is equal to said initial minimum width less said specified protrusion, and then reversing one ring relative to the other and reassembling the bearings so that the thrust faces of the rings are in their original, oppositely disposed relationship.

4. In a ball bearing having an inner ring with thrust and non-thrust faces and an outer ring with oppositely disposed thrust and non-thrust faces wherein said non-thrust faces define the minimum width H while the bearing is under a ball seating thrust load, the method of universal pre-load grinding to produce a specified protrusion P between each pair of adjacent faces, which consists in disassembling the bearing, then placing the non-thrust face of one ring upon the work support surface of a grinding machine, then reversing the position of the other ring and placing its non-thrust face upon said work support surface, and then grinding said thrust faces until both of said thrust faces are co-planar and of a width W which is equal to: $W = H + P$; and then reversing one ring relative to the other and reassembling the bearings so that the non-thrust faces of the rings are in their original oppositely disposed relationship.

5. In a ball bearing having an inner ring with thrust and non-thrust faces and an outer ring with oppositely disposed thrust and non-thrust faces with said non-thrust faces defining the minimum width of the bearing while the bearing is under a ball seating thrust load, the method of universal pre-load grinding to produce an equal specified protrusion between each pair of adjacent faces, which method consists in disassembling the bearing, then placing the non-thrust face of one ring upon the work support surface of a grinding machine, then reversing the position of the other ring and placing its non-thrust face upon said work support surface, and then grinding said thrust faces until both of said thrust faces are co-planar and both of said rings have a width equal to said minimum width plus said specified protrusion, and then reversing one ring relative to the other and reassembling the bearings so that the non-thrust faces of the rings are in their original, oppositely disposed relationship.

References Cited in the file of this patent

UNITED STATES PATENTS 1,722,494     Brunner _____ July 30, 1929